No. 892,671. PATENTED JULY 7, 1908.
B. MAZANEK.
CONVERTIBLE CAR.
APPLICATION FILED AUG. 25, 1906.
2 SHEETS—SHEET 2.
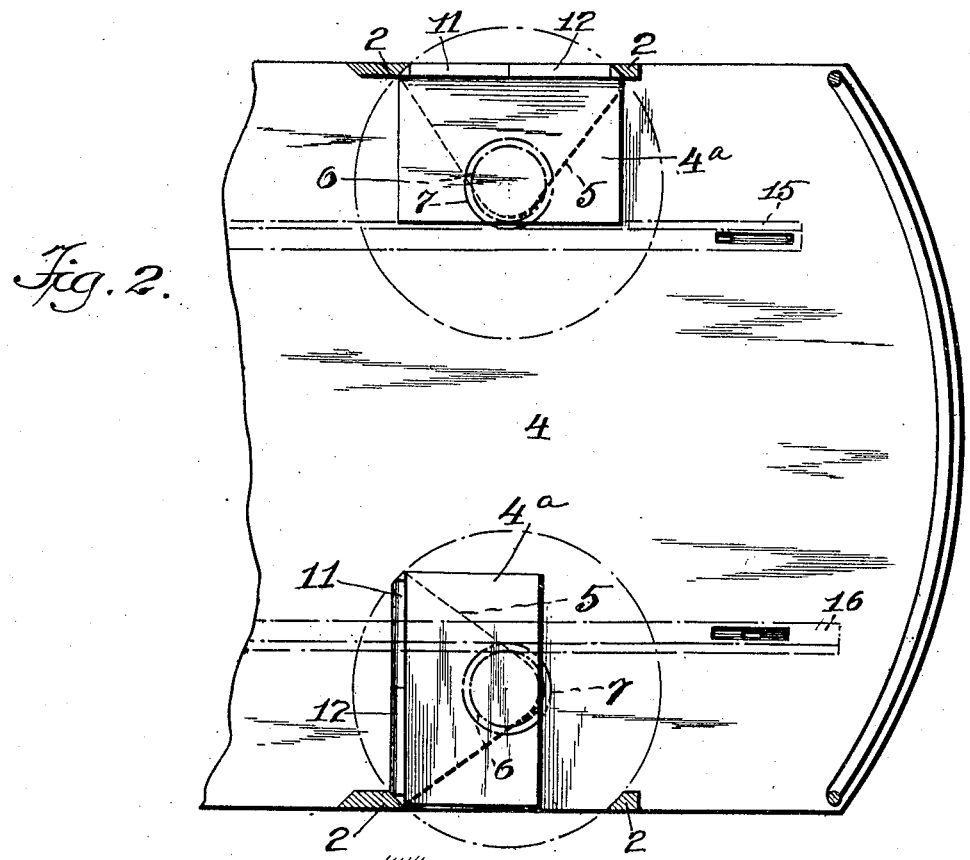

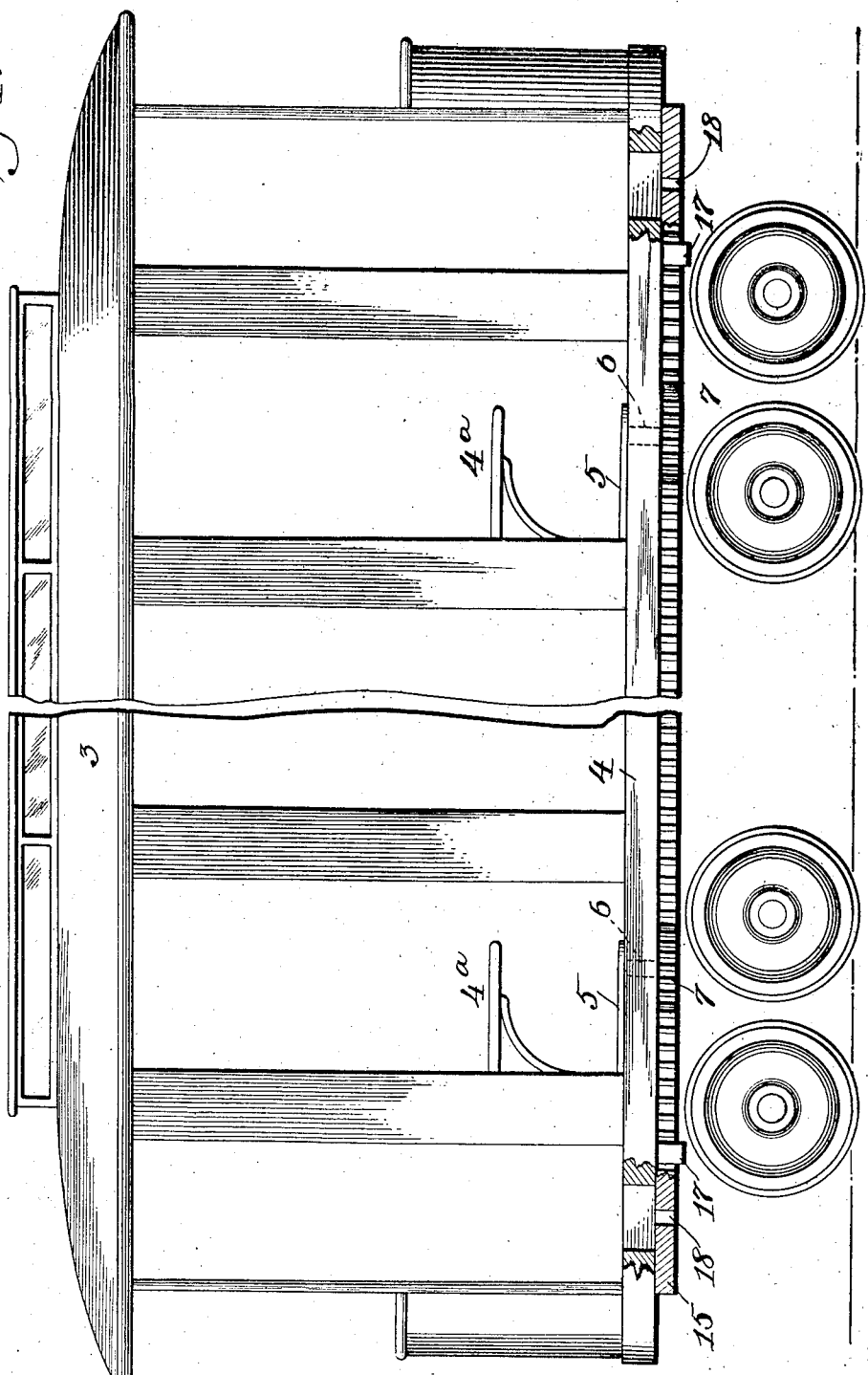

UNITED STATES PATENT OFFICE.

BEDRICH MAZANEK, OF NEW YORK, N. Y.

CONVERTIBLE CAR.

No. 892,671.  Specification of Letters Patent.  Patented July 7, 1908.

Application filed August 25, 1906. Serial No. 331,951.

To all whom it may concern:

Be it known that I, BEDRICH MAZANEK, a citizen of the United States, and resident of New York, in the county of New York and State of New York, have invented certain new and useful Improvements in Convertible Cars, of which the following is a specification.

My invention relates to cars, particularly to convertible cars.

It has for its object to provide a car adapted to be easily and readily converted from an open to a closed car, or vice versa, so that the same car may be used for summer and winter and when being used as an open summer car, if a storm comes up, may be closed so as to exclude the rain.

It has for a further object to provide a car having seats adapted to contain the windows and be turned to any desired position, either singly or as a whole, whereby in the summer they may be arranged longitudinally or transversely of the car and have the windows lowered therein, and in winter, or when a storm comes up in the summer they may be turned longitudinally of the car so that their backs will close in the lower parts of the spaces between the roof supporting posts and the windows raised to fill in the upper parts of the spaces between said posts and entirely exclude the weather.

It has for a still further object to provide a car of the character set forth embodying advantages in point of utility, convenience, ready adjustability, simplicity and inexpensiveness of construction.

In the drawings: Figure 1 is a side elevation showing the seats arranged to form an open car. Fig. 2 a horizontal sectional view, showing the seats arranged to close one side of the car and open the other side. Fig. 3 a fragmentary transverse vertical sectional view. Fig. 4 a fragmentary detail view of a corner of one of the seat-backs showing the manner of pivoting the guide sections.

In all the figures of the drawings illustrating my invention like reference character designates corresponding parts.

Referring to the drawings, 1 designates the car, 2 the posts, 3 the top and 4 the floor. Upon the floor of the car are pivotally mounted the seats 4ª, each having a base 5 provided with an integral stub-shaft 6 which projects through the floor and has a pinion 7 secured thereon. The seats being so located with reference to the posts, that when turned longitudinally of the car their backs 8 will fit closely between the posts filling up the lower part of the spaces between the said posts and forming the sides of the car and when turned transversely of the car will come approximately opposite said posts.

To provide for the close fitting of the seats and posts so as to exclude the weather, the side edges of the backs and the inner faces of the posts are curved on an arc taking the stub-shafts as their center.

The backs of the seats are made hollow and slidably contain windows 9 adapted to be raised, when the seats are turned to close the lower parts of the spaces between the posts, and close the upper parts of said spaces, thereby forming a closed car, and lowered into the hollow backs previous to the seats being turned to open the spaces between the posts, thereby forming an open car. Stops 10 are provided within the backs of the chairs upon which the windows rest and are held when in raised position and which they are adapted to pass when lowered into the chair backs.

The opening at the top of each chair back is closed by two grooved sections 11 and 12 pivoted to said chair back, which when turned up, contact with the inner faces of the posts and form portions of the window guides, the rest of the window guides being formed by grooved sections 13 secured to the inner faces of the posts and meeting the pivoted sections when they are turned up.

Racks 15 and 16 are reciprocally secured in guides 17 on the under face of the car floor, one of said racks engaging the cogs on the shafts of the seats on one side of the car and the other rack engaging the cogs on the shafts of the seats on the other side of the car and said racks being provided with holes 18 in their ends adapted to be engaged by a bar inserted through holes in the platform and said bar moved backward or forward to turn said seats on their pivots.

It will be understood that to adapt the seats to be turned independently of each other, the racks are removed.

The operation is as follows: To convert the car from a closed to an open car, the windows are lowered into the seat backs, the grooved sections 11 and 12 turned down over the openings in the seat backs and the seats turned on their pivots, so as to open the spaces between the posts, by sliding the racks, by means of a bar inserted into the holes in the ends of the racks and pushed in one direction, and to convert the car from an open to a closed car, the racks are slid in the opposite direction to bring the seat backs between the posts, the sections 11 and 12 turned up against the inner faces of the posts to meet the guides on said posts and the windows raised out of the seat backs until they rest on the stops 10.

I do not wish to be understood as limiting myself to the precise details and arrangement of parts shown and described, but reserve the right to all modifications within the scope of my invention.

Having now described my invention, what I claim as new and desire to secure by Letters Patent, is:

1. In a car, seats forming the sides thereof and pivoted to turn in horizontal direction and means for simultaneously turning said seats, substantially described.

2. In a car, seats forming the sides thereof and pivoted to turn in horizontal direction, windows slidably contained in said seats and means for simultaneously turning said seats, substantially described.

3. In a car, pivoted seats forming the sides thereof, window guides pivoted on said seats and windows slidably contained in said seats, substantially described.

Signed at New York in the county of New York and State of New York this 22nd day of August A. D. 1906.

BEDRICH MAZANEK.

Witnesses:
 FRANK SHILHAN,
 JAN MAZANEK.